Figure 1:
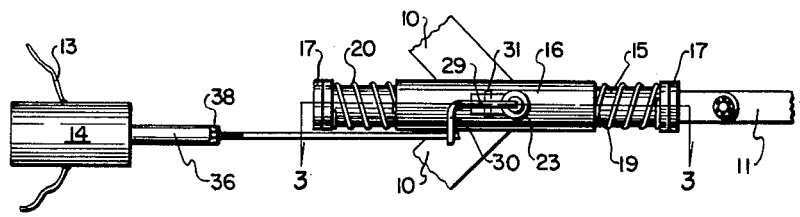

March 16, 1965 R. W. SILL 3,173,518
COUPLING MECHANISM FOR AUTOMATICALLY OPERATING TRAILER BRAKES
Filed March 9, 1964

INVENTOR
RUSSELL W. SILL, DECEASED
BY STERLING W. SILL, ADMINISTRATOR

BY *Mallinckrodt and Mallinckrodt*
ATTORNEY'S

United States Patent Office 3,173,518
Patented Mar. 16, 1965

3,173,518
COUPLING MECHANISM FOR AUTOMATICALLY OPERATING TRAILER BRAKES
Russell W. Sill, deceased, late of Layton, Utah, by Sterling W. Sill, administrator, 1205 S. Main St., Salt Lake City, Utah
Filed Mar. 9, 1964, Ser. No. 350,276
3 Claims. (Cl. 188—112)

This invention relates to brake operating mechanism for trailer brakes, and is concerned with providing an efficient mechanism for both coupling a trailer to a tow vehicle and for automatically actuating brakes on the trailer.

Most trailers adapted to be pulled by passenger automobiles are not themselves equipped with brake systems. Slowing down or stopping of such an automobile-trailer combination is, therefore, dependent entirely upon the braking of the automobile through the usual brake application, engine retardation, or both. The trailer, especially if it is heavily loaded, tends to overrun the automobile, placing additional stress on the braking system thereof and sometimes structurally damaging the chassis. It is not unknown for the trailer to weave from side to side behind the automobile in such instances and to flip over, damaging the trailer and goods carried therein and, sometimes, even causing the automobile to turn over.

While most large transport trailers are equipped with air or hydraulic brake systems operatively integrated with the brake systems of their tractive units, there is considerable room for improvement in the mechanism used to insure automatic application of the brakes.

A principal object of the present invention is to provide simple and inexpensive mechanism for automatically operating a trailer brake system in accordance wtih operation of the brakes of the towing vehicle, whereby even very light trailers can be advantageously equipped with brakes.

Further objects are to provide such a mechanism that will apply the trailer brakes smoothly and positively any time momentum of the trailer is increased or decreased relative to the momentum of the towing vehicle, regardless of the direction of travel of such towing vehicle, whether forward or reverse, and that will smoothly and automatically release the brakes in response to pulling or pushing by the towing vehicle as it moves.

An important feature of the invention is a two-way cam coupling disposed between towing vehicle and trailer and including a drawbar having a cam surface thereon, centering means for the drawbar, a cam follower, and linkage interconnecting the cam follower and a master brake cylinder piston or other brake actuating means of the trailer brake system.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

Figure 2:
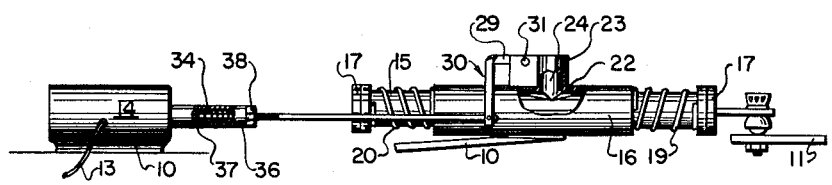
Figure 3:
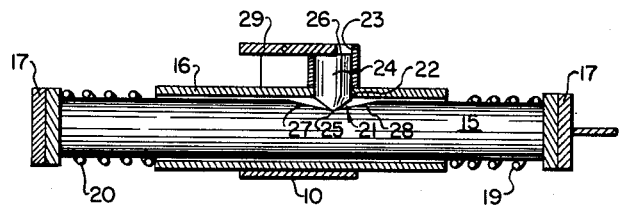
Figure 4:
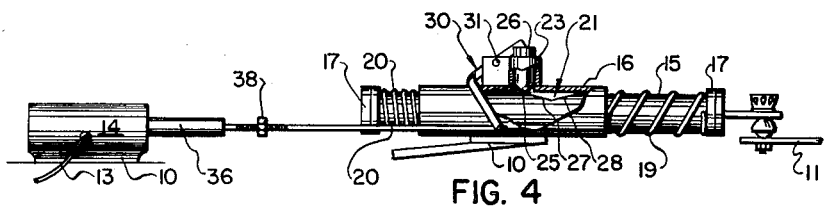
Figure 5:
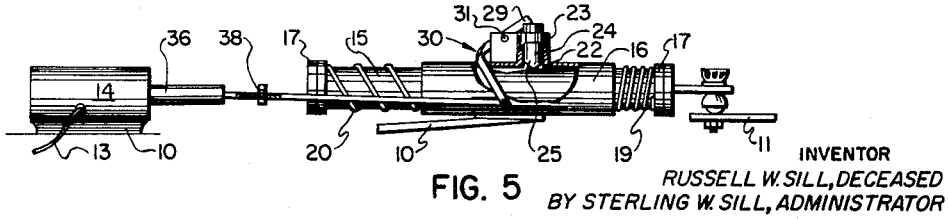

In the drawing:

FIG. 1 is a top plan view of the coupling mechanism of the invention, with a trailer and a trailer hitch to which it is connected shown fragmentarily;

FIG. 2, a side elevation of the coupling mechanism, partially broken away to show the brake-actuating spring;

FIG. 3, a vertical section taken on line 3—3 of FIG. 1;

FIG. 4, a view similar to FIG. 2, but with the actuator cam moved to a pulled position; and FIG. 5, a similar view, with the actuator cam in a pushed position.

Referring now to the drawing:

In the illustrated preferred embodiment, the coupling mechanism of the invention is shown serving as a tongue connecting the frame 10 of a trailer with a trailer hitch 11, which, in turn, is secured to an automobile or other towing vehicle (not shown).

The trailer is equipped with its own independent and conventional braking system, including the brake lines shown fragmentarily at 13 as leading to the individual wheel brakes (not shown), and a hydraulic master brake cylinder 14.

The vehicle-coupling and brake-applying mechanism of the invention includes an elongate drawbar 15, positioned for reciprocation within housing 16; abutment means in the form of shoulders 17 at each end of the drawbar; and centering springs 19 and 20 positioned intermediate the abutment means and housing 16. A generally V-shaped cam-groove 21 is formed on drawbar 15 intermediate its length, and, when the drawbar is centered by springs 19 and 20, the bottom of the groove is positioned beneath an opening 22 extending through housing 16.

Opening 22 is surrounded by a sleeve 23, and a cam follower 24 reciprocates within sleeve 23.

Cam follower 24 has one pointed end 25 extending into and received by cam-groove 21 and the other end 26 protruding out of sleeve 23. Reciprocation of drawbar 15 within housing 16 wedges either wall 27 or wall 28 of cam-groove 21 beneath pointed end 25, thereby reciprocating cam follower 24 within sleeve 23.

As cam follower 24 moves upwardly within sleeve 23, it abuts leg 29 of lever 30 to pivot such lever about a pin 31, which extends through the lever and through an upstanding flange 32 fixed to housing 16. This pivots leg 33 of lever 30 counterclockwise about pin 31, as viewed in FIGS. 2-5, and, by overcoming the biasing effect of spring 34, moves rod 35 to the right and releases the trailer brakes.

The brakes are normally held in applied condition by a spring 34, which abuts housing 36 and pushes against a collar 37 threaded on rod 35. Rod 35 is fixed to the usual piston in master brake cylinder 14 such that, when rod 35 is biased to the left, the brakes are applied, and when rod 35 is moved to the right, the brakes are released. A stop 38 is threaded on rod 35 and abuts housing 36 to limit movement of rod 35 to the left, thus preventing damage to the master brake cylinder, as well as providing means for adjusting the sensitivity of the trailer brake actuation.

The position of stop 38 determines the distance, if any, between leg 29 of lever 30 and cam follower 24 when rod 35 is in its extreme biased position. Stop 38 can readily be positioned along rod 35 to allow a predetermined amount of upward movement of the cam follower before lever 30 is pivoted to release the brakes. This means that, within the limitations imposed by the strength of the centering springs, the force required to release the brakes can be set as desired.

In operation, the trailer hitch 11 is fixed to a towing vehicle, and drawbar 15 is connected to the trailer hitch through the usual ball and socket hitch members. When the towing vehicle and the trailer are not moving, or tending to move with respect to each other, springs 19 and 20 center drawbar 15, cam follower 24 drops down to its lowermost position, and spring 34 biases rod 35 to the brake actuating position. Should the tow vehicle be moved forward, cam follower 24 will be moved up by the wedging action of wall 27, as viewed in FIG. 4, to contact lever 29 and release the trailer brakes. If the tow vehicle is backed, drawbar 15 is moved to the left within housing 16, as seen in FIG.

5; cam follower 24 is moved up by the wedging action of wall 28 to contact lever 29, and the trailer brakes are released.

Should the two vehicle be moving forward and then be slowed either by braking or by engine retardation, or both, the trailer, including the housing 16, would tend to overrun the tow vehicle and drawbar 15. As the housing moves forward with respect to the drawbar, cam follower 24 drops to the bottom of cam-groove 21 and the brakes are applied to slow the trailer until drawbar 15 is once again pulled forward with respect to housing 16. Should the momentum of the tow vehicle be slowed so suddenly by application of the vehicle brakes that the trailer brakes cannot correspondingly slow the trailer rapidly enough to prevent cam follower 24 moving partially up wall 27, or should the momentum of the trailer be increased, as it may be during downhill travel, for example, with similar effect, the trailer brakes will not be released since follower 24 will not immediately contact lever 29. This lag insures continued brake actuation for a period sufficient to prevent the trailer overriding the towing vehicle. As was previously explained, the distance follower 24 can freely move is determined by the position of stop 38, and can be set as desired.

Although the trailer brake system is here illustrated as being hydraulically powered, it should be obvious that the same coupling mechanism can as well be used to actuate other brake systems. Thus, the trailer brakes can be pneumatically powered, or even mechanically operated, for example, so long as rod 35 is properly connected to the brake actuator.

Whereas there is here illustrated and specifically described a certain preferred construction of apparatus which is presently regarded as the best mode of carrying out the invention, it should be understood that various changes may be made and other constructions adopted without departing from the inventive subject matter particularly pointed out and claimed herebelow.

What is claimed is:

1. Coupling mechanism for automatically operating a braking system of a trailer in accordance with differential speed of said trailer and its towing vehicle, which braking system includes actuating means for the trailer brakes, said coupling mechanism including, in combination, a drawbar having a hitch member at one end; a housing adapted to be fixed to the trailer and slidably receiving the drawbar therethrough; means yieldably centering said drawbar in said housing; a generally V-shaped cam surface on said drawbar; a pointed cam follower extending through said housing and into engagement with said cam surface, the bottom of said cam surface receiving the point of said cam follower when said drawbar is in a centered position within the housing; means guiding said cam follower for reciprocating movement in response to wedging action of the walls of said cam surface as said drawbar slides in said housing; a pivot pin fixed to the housing; a lever having one leg extending above the cam follower and adapted to be contacted thereby and another leg depending therefrom, said lever being pivotally mounted intermediate its ends on said pivot pin; a linkage rod pivotally connected to said depending leg and to the actuating means for the trailer brakes; means biasing said linkage rod toward brake actuating position and biasing said leg of the lever extending above the cam follower, toward said cam follower; and stop means on said rod for limiting movement of the rod in the biased direction, said stop means being adjustably positioned along the length of the rod.

2. A coupling mechanism according to claim 1 wherein the means yieldably centering the drawbar in the housing comprises abutment means on each end of the drawbar, and springs surrounding said drawbar and positioned between said abutment means and said housing.

3. Coupling mechanism for automatically operating a braking system of a trailer in accordance with differential speed of said trailer and a towing vehicle, which braking system includes, actuating means for the trailer brakes, said coupling mechanism including, in combination, a drawbar having a hitch member at one end; a housing adapted to be fixed to the trailer and slidably receiving the drawbar therethrough; a cam surface on said drawbar, said cam surface having a pair of high surfaces and an intermediate low surface; a cam follower positioned to ride on said cam surface; linkage means interconnecting said cam follower and the actuating means for the trailer brakes; and biasing means constructed and arranged to bias the linkage means into brake actuating position when the cam follower is positioned at the intermediate low surface, said biasing means being yieldable to allow said drawbar to move to a brake releasing position.

References Cited by the Examiner

FOREIGN PATENTS 282,772    2/31    Italy.

ARTHUR L. LA POINT, *Primary Examiner.*

DUANE A. REGER, *Examiner.*